United States Patent
Tsumura et al.

[11] Patent Number: 5,990,874
[45] Date of Patent: Nov. 23, 1999

[54] PROTECTIVE COVER FOR A PORTABLE APPARATUS TOUCH PANEL

[75] Inventors: Toshiyuki Tsumura; Yoshihisa Naito, both of Kanagawa, Japan

[73] Assignee: Matsushita Electric Industrial Co., Ltd., Osaka, Japan

[21] Appl. No.: 08/901,481

[22] Filed: Jul. 28, 1997

[30]    Foreign Application Priority Data

Aug. 2, 1996 [JP] Japan .................................. 8-204438

[51] Int. Cl.$^6$ .................................................. G09G 5/00
[52] U.S. Cl. ...................... 345/173; 345/175; 345/100; 345/104; 382/185; 382/187
[58] Field of Search .................................. 345/100, 175, 345/104, 173; 382/187, 185

[56]            References Cited

U.S. PATENT DOCUMENTS

| | | | |
|---|---|---|---|
| 4,899,137 | 2/1990 | Behrens | 361/58 |
| 5,233,502 | 8/1993 | Beatty et al. | 345/172 |
| 5,341,154 | 8/1994 | Bird | 345/173 |
| 5,584,054 | 12/1996 | Tyneski et al. | 345/156 |
| 5,646,649 | 7/1997 | Iwata et al. | 345/100 |

*Primary Examiner*—Steven J. Saras
*Assistant Examiner*—Amr Awad
*Attorney, Agent, or Firm*—Pearne, Gordon, McCoy & Granger LLP

[57]            ABSTRACT

A portable apparatus including a transparent and flexible protective lid which openably and closably covers a touch pad which also serves as a display screen. The lid has a U-shaped slit portion formed therein and has a protrusion on a surface of the U-shaped slit portion facing the touch panel. When the protective lid is closed, the slit portion may be pushed down to actuate the touch panel. When the protective lid is open, the touch panel may be directly actuated.

4 Claims, 4 Drawing Sheets

PROTECTIVE COVER FOR A PORTABLE APPARATUS TOUCH PANEL

BACKGROUND OF THE INVENTION

The present invention relates to a portable apparatus having means for inputting data through a touch panel, and particularly to the structure of a protective lid for a touch panel surface.

Recently, various functions are mounted on a portable apparatus, a touch panel is widely used in such a portable apparatus for simplifying complicated functional operations and data input. Such a touch panel, however, has a problem that although the touch panel is conveniently easy to input data, it is easily influenced by external pressure, electrostatic noise, etc. when the apparatus is carried because the touch panel has such a structure that its display screen is directly touched with a pen. It is therefore necessary to provide a protective lid when the apparatus is carried.

FIGS. 5A and 5B show a configuration of a paging receiver with display as an example of a conventional portable apparatus with a touch panel. A touch-panel and display-screen 2 is provided in an apparatus body 1 so that input can be made through the touch panel. An openable/closable protective lid 3 is attached, by means of an opening/closing support portion 4, to the touch-panel and display-screen 2 for protecting the touch-panel and display-screen 2 from electrostatic noise and external pressure. When data is inputted through the touch panel, the protective lid 3 is opened as shown in FIG. 5A so as to perform operation of the apparatus and input of data. On the other hand, when the apparatus is carried, the protective lid 3 is closed as shown in FIG. 5B to protect the touch-panel and display screen 2. When the paging receiver receives its own address by means of a radio signal, a call ringing is generated from a speaker to inform a user of call reception and, at the same time, a message is displayed on the touch-panel and display screen 2. The call ringing from the speaker 5 can be stopped if the user pushes down a mechanical switch 6.

In such a configuration of the conventional portable apparatus with a touch panel, there has been a problem that, when the protective lid 3 is in a closed state, the touch-panel and display-screen 2 is covered with the protective lid 3, so that not only it is impossible to confirm the displayed contents of the apparatus but also it is impossible to operate the apparatus. In the case of an information terminal such as a paging receiver, there is a case where an alarm or a call operation is generated in an unexpected timing with the protective lid 3 kept closed. In such a case, operation is necessary to confirm the displayed contents and to stop the call ringing immediately. There has been a further problem that it is necessary to provide such a mechanical switch 6 separately from the touch panel so that a user can push down the mechanical switch 6 to stop the call ringing even in the case where the protective lid 3 is in a closed state. This results in an interference with the miniaturization of the apparatus, and causes the number of parts to increase to thereby increase the cost.

SUMMARY OF THE INVENTION

In order to solve the foregoing problems in the conventional apparatus, it is an object of the invention to provide a superior portable apparatus in which, even in the state where a protective lid is closed, not only the contents displayed on the apparatus can be confirmed but also a touch panel can be operated, so that the apparatus can be made small in size and low in cost.

In order to attain the foregoing object, according to the present invention, the protective openable/closable lid is made to be transparent so that the contents displayed on the apparatus can be confirmed with the protective lid kept closed, and that a touch panel can be operated also with the protective lid kept closed. Accordingly, even in the case where the portable apparatus is provided with a touch panel, it is possible to confirm the displayed content with the lid kept closed if necessary, and it is possible to operate the apparatus instantly with the lid of the touch panel kept closed.

According to a first aspect of the present invention, provided is a portable apparatus with a touch panel having means for inputting data through the touch panel, wherein an openable/closable protective lid provided for protecting a touch-panel and display-screen is made transparent. The apparatus has a function that it is possible to instantly confirm the contents displayed with the protective lid kept closed when the apparatus is carried.

Further, in the above portable apparatus with a touch panel according to a second aspect of the present invention, the touch-panel and display-screen can be operated by pushing down the protective lid partially or wholly with the protective lid kept closed. Thus, the apparatus has a function that the touch panel can be pushed down partially with the protective lid kept closed when the apparatus is carried to realize an instant operation with the lid closed. In addition, it is not necessary to provide a mechanical switch separately from the touch panel even in an apparatus needing an instant operation. Accordingly, there is an effect that the number of parts and hence the cost can be reduced.

DETAILED DESCRIPTION OF THE PREFERRED EMBODIMENTS (Embodiment 1)

Figure 1A:
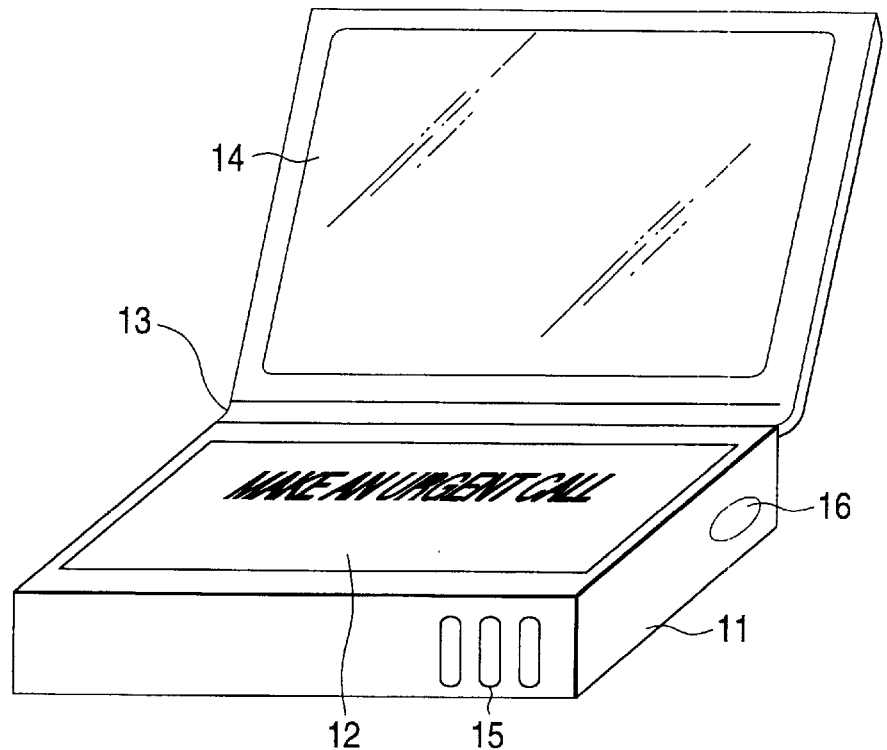
FIG. 1A is a perspective view showing the state where a protective lid is opened in an embodiment 1 of the present invention.
Figure 1B:
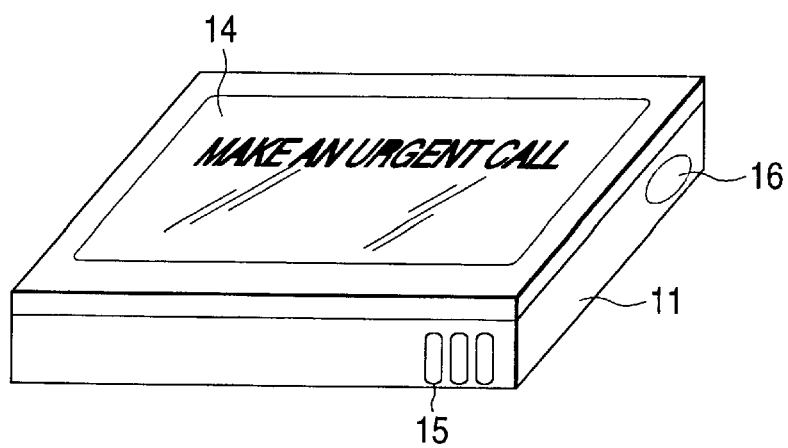
FIG. 1B is a perspective view showing the state where the protective lid is closed in the embodiment 1 of the present invention.

An embodiment of the present invention will be described below with reference to FIGS. 1A to 1B. In this embodiment, the present invention is applied to a paging receiver with display having key-input through a touch panel. FIGS. 1A and 1B show the configuration of the first embodiment of the present invention. In FIGS. 1A and 1B, the reference numeral 11 represents a body of an apparatus which is a paging receiver with display. The apparatus body 11 has a touch-panel and display-screen 12. The contents such as messages received by the paging receiver, clock display, and so on, are displayed on the touch-panel and display-screen 12. On the other hand, switching operations for various functions can be performed by direct touch on the touch-panel and display-screen 12. The touch-panel and display-screen 12 is formed from glass or PET film so that it is weak against external pressure and electrostatic noise. The touch-panel and display-screen 12 is therefore provided with an openable/closable transparent protective lid 14 disposed thereon through an opening/closing support portion 13. Upon reception of its own address by means of a radio signal, the paging receiver with display in this embodiment informs a user of reception of a call by ringing produced from a speaker 15, and, at the same time, displays a message accompanied with the call on the touch-panel and display-screen 12. The ringing sound from the speaker 15 can be stopped by depression of a switch 16.

FIG. 1A shows the state where the thus configured paging receiver with its transparent protective lid 14 opened has received its own address, a ringing sound is generated from the speaker 5, and, at the same time, a message of "Make an urgent call" is displayed on the touch-panel and display-screen 12. FIG. 1B shows the state where the touch-panel and display-screen 12 is closed by the transparent protective lid 14 when the paging receiver is carried. Even in such a case, when a paging call is received by the paging receiver, a message based on the paging call is displayed on the touch-panel and display-screen 12, and the displayed message can be seen through the transparent protective lid 14 which is in the closed state. Conventionally, the display cannot be seen in the condition that a protective lid is closed, and a troublesome operation to open the protective lid once is required to see the display of a message according to a call. Such a troublesome operation is not necessary in the apparatus according to the present invention.

(Embodiment 2)

Figure 2A:
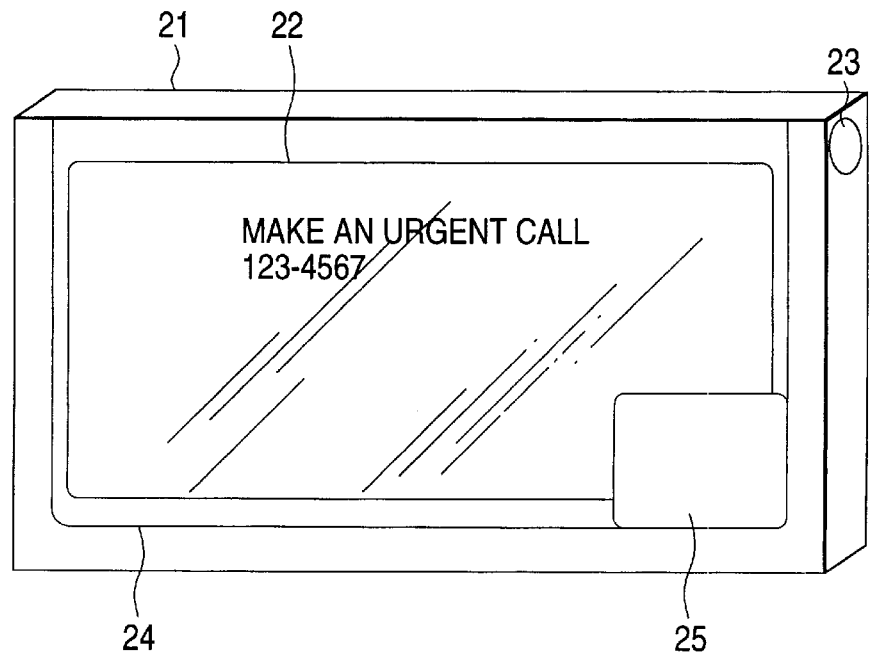
FIG. 2A is a perspective view showing the state where a protective lid is closed in an embodiment 2 of the present invention.
Figure 2B:
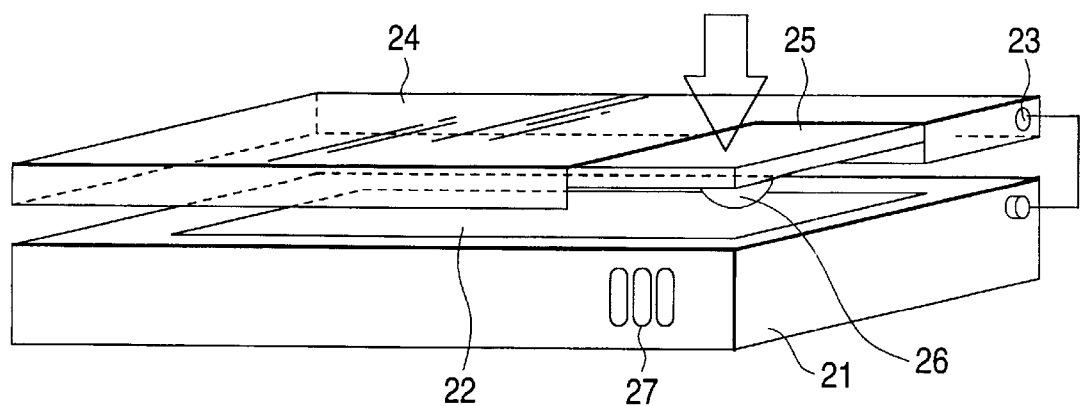
FIG. 2B is an exploded perspective view showing the state where the protective lid is closed in the embodiment 2 of the present invention.

FIGS. 2A and 2B show the configuration of the second embodiment of the present invention. The reference numeral 21 represents a body of the apparatus which is a paging receiver with display. The apparatus body 21 has a touch-panel and display-screen 22 on which the contents such as messages received by the paging receiver, clock display, and so on, can be displayed, while switching operations for various functions can be performed by direct touch on the touch-panel and display-screen 22. The touch-panel and display-screen 22 is formed of glass or PET film so that it is weak against external pressure and electrostatic noise. The touch-panel and display-screen 22 is therefore provided with an openable/closable transparent protective lid 24 disposed thereon through an opening/closing support portion 23. A part of this transparent protective lid 24 is made to be a lid-movable portion 25. If a user pushes down the lid-movable portion 25 by a finger in the direction of arrow in FIG. 2B, a movable-portion protrusion 26 pushes down a switch portion of the touch-panel and display-screen 22.

In the thus configured paging receiver with display, the paging signal receiving operation is similar to that in the above-mentioned embodiment 1. FIG. 2A shows the state where the paging receiver has received its own address, a ringing sound for information is generated from the speaker 27, and, at the same time, a message of "Make an urgent call" is displayed on the touch-panel and display-screen 22. Then, if a user pushes the lid-movable portion 25 in the direction of arrow in FIG. 2B, a switch provided on the touch-panel and display-screen 22 for stopping the information by the ringing sound from the speaker 27 is pushed down to thereby stop the ringing information. Although a separately-provided information-stopping switch is required in the above-mentioned embodiment 1, such a separately-provided switch is not necessary in this embodiment 2. Thus, in this embodiment 2, since no separately-provided switch is necessary, it is possible to reduce the cost of parts and to reduce the size of the apparatus.

Figure 3A:
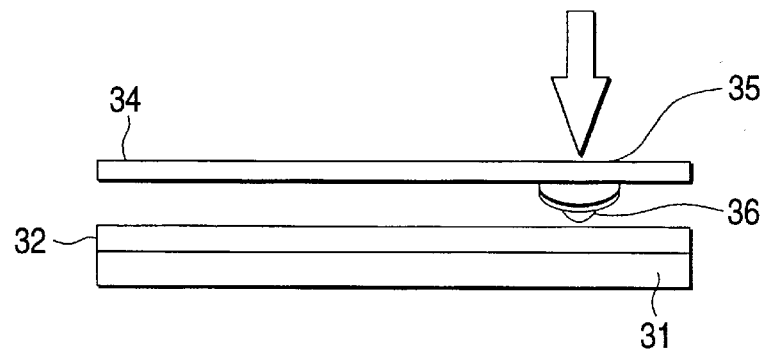
FIG. 3A is an exploded side view showing the state where a protective lid is closed in a modification of the embodiment 2 of the present invention.
Figure 3B:
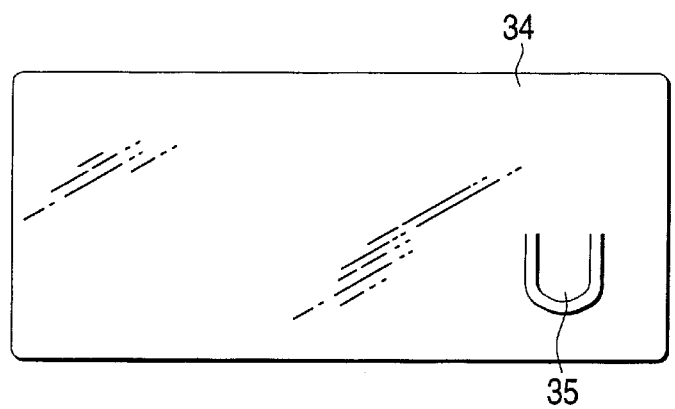
FIG. 3B is a top view showing the state where the protective lid is closed in the modification of the embodiment 2 of the present invention.

In the above-mentioned embodiment 2, the lid-movable portion 25 may be modified in design. FIGS. 3A and 3B show an example of the modification, in which a U-shaped slit is formed in a part of the transparent protective lid 34 to thereby form a lid-movable portion 35 which is made movably by the slit. A movable-portion protrusion 36 is provided on the back surface of the head portion of the lid-movable portion 35. If a user pushes the lid-movable portion 35 toward the apparatus body 31 (i.e., in the direction of arrow in FIG. 3A), the movable-portion protrusion 36 contacts with an opposite portion of a touch-panel and display-screen 32, so that the touch panel can be operated with an effect similar to that in the embodiment 2.

Figure 4A:
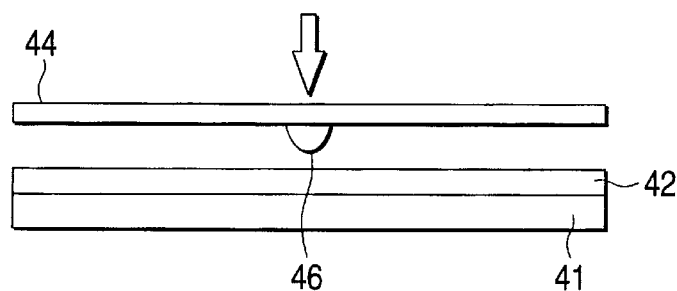
FIG. 4A is an exploded side view showing the state where a protective lid is closed in another modification of the embodiment 2 of the present invention.
Figure 4B:
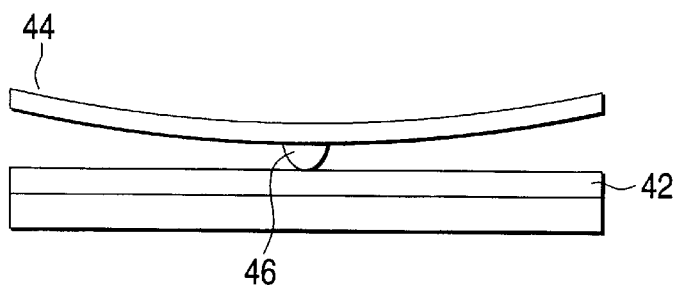
FIG. 4B is an exploded side view showing the state where the protective lid is closed in the modification of the embodiment 2 of the present invention.
Figure 5A:
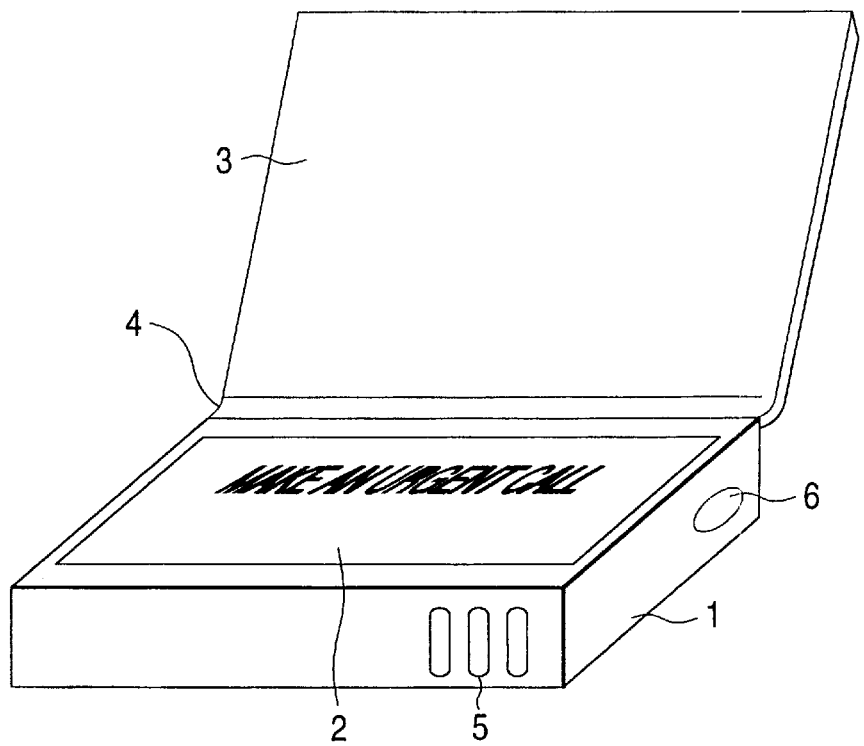
FIG. 5A is a perspective view showing the state where a protective lid is opened in a conventional example.
Figure 5B:
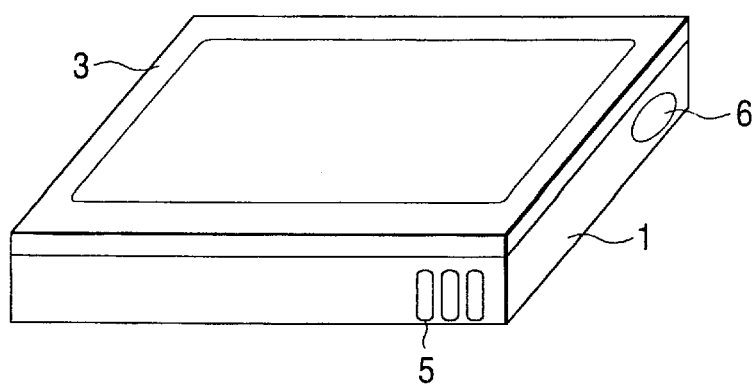
FIG. 5B is a perspective view showing the state where the protective lid is closed in the conventional example.

FIGS. 4A and 4B show another modification of the embodiment 2, in which if a user pushes a transparent protective lid 44 down wholly, a touch-panel and display-screen 42 is pushed down thereby. A movable-portion protrusion 46 is provided at the center portion of the back surface of the transparent protective lid 44. The transparent protective lid 44 is formed from material having flexibility. Accordingly, if a user pushes the transparent protective lid 44 toward the apparatus body 41 (i.e., in the direction of arrow in FIG. 4A), the center portion of the lid 44 is bent so that the movable-portion protrusion 46 comes into contact with an opposite portion of the touch-panel and display-screen 42 to thereby operate the touch panel with an effect similar to that in the embodiment 2.

Although a paging receiver was described by way of example in the above embodiments, the present invention is not limited to the paging receiver, but is applicable also to any other portable apparatus with a touch-panel and display-screen with a similar effect.

As has been described above, in a portable apparatus having means for inputting data through a touch panel according to the present invention, an openable/closable protective lid provided for protecting a touch-panel and display-screen is made transparent so as to obtain such an effect that the display screen can be seen to thereby confirm the display of the apparatus instantly even in the case where the protective lid is in a closed state. In addition, when the openable/closable protective lid provided for protecting the touch-panel and display-screen is made movable partially or wholly, the touch-panel and display-screen can be operated by pushing down the protective lid partially or wholly even in the case where the protective lid is in a closed state. Thus, such an effect can be obtained that not only it is possible to perform a switching operation even in the closed state of the protective lid, but also it is also possible to limit the number of mechanical switches other than the touch panel to the minimum. Accordingly, it is possible to reduce the size and cost of the apparatus.

What is claimed is:

1. A portable apparatus with a touch panel comprising:
a transparent and flexible protective lid, said lid being movable between an open position exposing said touch panel and a closed position covering said touch panel, said touch panel also serving as a display screen, said lid having a U-shaped slit portion formed in a part of said lid and having a protrusion provided on a surface of said U-shaped slit portion facing said touch panel,
wherein, when said protective lid is in the closed position, said slit portion may be pushed down to thereby actuate said touch panel and, when said protective lid is in the opened position, said touch panel may be directly actuated.

2. A portable apparatus with a touch panel comprising:
a protective lid, said lid being movable between an open position exposing said touch panel and a closed position covering said touch panel, said touch panel also serving as a display screen, said lid having a transparent lid-movable portion which is movable up and down partially and having a protrusion provided on a surface of said transparent lid-movable portion facing said touch panel,
wherein, when said protective lid is in the closed position, said touch panel is visible through said transparent lid-movable portion of said protective lid and said lid-movable portion may be pushed down to thereby actuate said touch panel and, when said protective lid is in the open position, said touch panel may be directly actuated.

3. A portable apparatus with a touch panel comprising:

means for inputting data through said touch panel, and a protective lid, said protective lid being movable between an open position exposing said touch panel and a closed position covering said touch panel, said touch panel also serving as a display screen, wherein at least a portion of said protective lid is transparent to permit a user to view said touch panel when said lid is in said closed position, said transparent portion of said lid being flexibly deformable to permit a user to push the transparent portion toward said touch panel and thereby actuate said touch panel when said protective lid is in the closed position.

4. A portable apparatus with a touch panel according to claim 3, wherein a surface of said protective lid facing said touch panel includes a protrusion which engages and actuates said touch panel when said transparent portion is pushed toward said touch panel.

* * * * *